United States Patent [19]

Haglund

[11] Patent Number: 5,224,256
[45] Date of Patent: Jul. 6, 1993

[54] METHOD OF ASSEMBLY OF TUBULAR METALLIC FENCES

[76] Inventor: Vernon Haglund, 2029 N. Ocean Blvd., Fort Lauderdale, Fla. 33305

[21] Appl. No.: 796,269

[22] Filed: Nov. 22, 1991

Related U.S. Application Data

[63] Continuation-in-part of Ser. No. 771,556, Oct. 7, 1991.
[51] Int. Cl.$^5$ ............................................. B21D 39/04
[52] U.S. Cl. ........................................ 29/523; 72/392; 256/22
[58] Field of Search .................... 72/392, 393; 29/523; 256/22, 65

[56] References Cited

U.S. PATENT DOCUMENTS

| | | | |
|---|---|---|---|
| 2,542,305 | 2/1951 | Brinen et al. | 72/393 |
| 2,614,827 | 10/1952 | Peach et al. | 256/65 |
| 3,103,068 | 9/1963 | Hinz et al. | 72/393 |

Primary Examiner—Lowell A. Larson
Attorney, Agent, or Firm—Melvin K. Silverman

[57] ABSTRACT

The invention relates to a method of assembling mechanical system having tubular constructional elements, such methods including the furnishing of an interior work surface of a first constructional element having a complemental internal structure and, further, positioning a second tubular constructional element so that at least one surface thereof is proximal to the complemental internal surface of the first constructional element. The method further includes the step of positioning, within the second constructional element a working element of a highly extended longitudinal tool reciprocatingly within the second constructional element, the working element situated proximally to the complemental internal structure of the first construc-tional element. The method also includes the step of applying, through the longitudinal and tool to the working member a transverse force sufficient to deform the one surface of the second constructional element into the geometry of a complemental structure of the first constructional element, securing the respective elements to each other.

4 Claims, 11 Drawing Sheets

METHOD OF ASSEMBLY OF TUBULAR METALLIC FENCES

REFERENCE TO RELATED APPLICATION

This case is a continuation-in-part of application Ser. No. 07/771,556, filed Oct. 7, 1991, entitled Riveting System.

BACKGROUND OF THE INVENTION

In the assembly of fences and railings consisting of picket elements, a labor-intensive aspect associated with the construction of such fences has resided in the attachment of the picket elements thereof with the transverse members of the fence. More particularly, in recent years, certain metallic picket fences consisting of hollow tubular elements have come into vogue to the extent that, in many applications, wooden picket fences are now rarely used. Metal picket fences of this type are shown in FIGS. 1, 2 and 11 of the Drawings.

A difficult and laborious aspect of the assembly of such metal picket fences lies in the connection (also known as the swedge) of the tubular pickets at the points thereof at which they pass through or within the horizontal cross-members of the fencing system. Historically, this connection has been effected by means of welding of the vertical pickets at each point that one passes through a transverse horizontal member. This process is time-consuming, inexact and often unaesthetic in that the paint or other coating upon the elements of the fence may be broken, burnt otherwise rendered unsightly by such welding thereupon. Proper fusion of the paint finish at welded points is therefore nearly impossible. Thusly, cracking, pealing, chipping is a result.

Where, in the past, screws were used to secure the respective members, the result was that of rusting, vibrating and loosening of the screws and eventually of their falling-off of the structure.

The instant invention is concerned with an assembly method, the usage of which will obviate the need for welding or any other external process to effect the connection of hollow or tubular vertical picket elements within transverse hollow or tubular members of a metal fence system.

In addition to the need for a method of more easily assembling metal picket fences of the type shown in the drawings, there exists a need for a constructional method for the positioning of emblems, and the like, upon the tops of picket fences. Such a fence is shown in the view of FIG. 11.

In addition to the need for an improvement in existing methods of assembly of tubular picket fences, there exists numerous other mechanical systems in which one or more elongated tubular constructional element must be secured to a second tubular constructional element. One example of a structure of this type appears in FIG. 14 in which there is shown a metal ladder. Metal ladders are typically formed of a series of hollow transversely disposed step elements which are secured to the internal structure of a pair of elongated vertical side elements. In the construction of such a ladder, it is necessary to either secure the transverse elements to the longitudinal elements or to secure the longitudinal elements to the transverse elements. The latter is more cost-effective and is facilitated by the present method.

In general, the instant method affords a technique for the reaching of securement sites that are separated from the worker at a site otherwise difficult to reach, or in which the work site is enclosed by the geometry of the constructional element and thereby rendered difficult to access. This is typically the case where a work location is enclosed within an elongated tubular structure which, typically, will have an uniform cross-section.

It is in response to the long-felt need for such a constructional method that the present invention is directed.

SUMMARY OF THE INVENTION

The present invention relates to a method of assembly of components of a tubular metallic picket fence, comprising the steps of furnishing, at an interior work site of a horizontal metallic tubular constructional element of the picket fence to be assembled, at least one internal structure having a defined geometry; providing, through said horizontal constructional element, a vertical opening proximal to said defined internal structure, to enable passage therethrough of a vertical tubular constructional element; positioning said vertical tubular constructional element within said vertical opening of said horizontal element so that at least one surface of said vertical element is proximal to said defined internal structure of said horizontal element; providing, within said vertical tubular element, at said one surface of said vertical constructional element, a distal portion of a highly extended longitudinal member of substantially uniform cross-section having a smaller external diameter than the internal diameter of said vertical tubular element, said distal portion comprising at least one working surface transversely extensible in reaction to longitudinal extension of said extended member; and providing and applying, through said extended longitudinal member, selectable powered longitudinal thrust of said extended member, sufficient provide to said working surface of said distal portion of said extended member, a transverse force sufficient to deform said one surface of said vertical tubular constructional into said defined geometry of said internal structure of said horizontal tubular element, thereby effecting the securement of said vertical and horizontal construction elements of the fence system to each other.

It is an object of the present invention to provide a method of assembly of mechanical systems in which the constituent constructional elements thereof are tubular elements.

It is another object of the invention to provide a method of constructional assembly having particular value when a site of connection between constructional elements is separated from the location of the worker by a distance on the order of feet or where the working site is completely enclosed by the geometry of the constructional elements.

It is a further object of the present invention to provide a securement system particularly adapted for the connection of picket elements of a metal fence to each other without requirement for the use of welds, screws or mechanical fasteners.

It is a yet further object of the invention to provide a method for enhancing the ease of construction of hollow metallic picket fences and other mechanical systems formed of tubular constructional elements.

The above and yet other objects and advantages of the present invention will become apparent from the hereinafter set forth Brief Description of the Drawings,

DETAILED DESCRIPTION OF THE INVENTION

With reference to the views of FIGS. 1, 2, 11 and 14, examples of the types of structures to which the present inventive method relates may be seen. More particularly, it is noted that each of these structures required joiner or securement between tubular constructional elements. It is, therefore, to be appreciated that the instant inventive method set forth below not be considered as limited to those specific structures which, by way of example, are set forth within this description of the invention.

Figure 1:
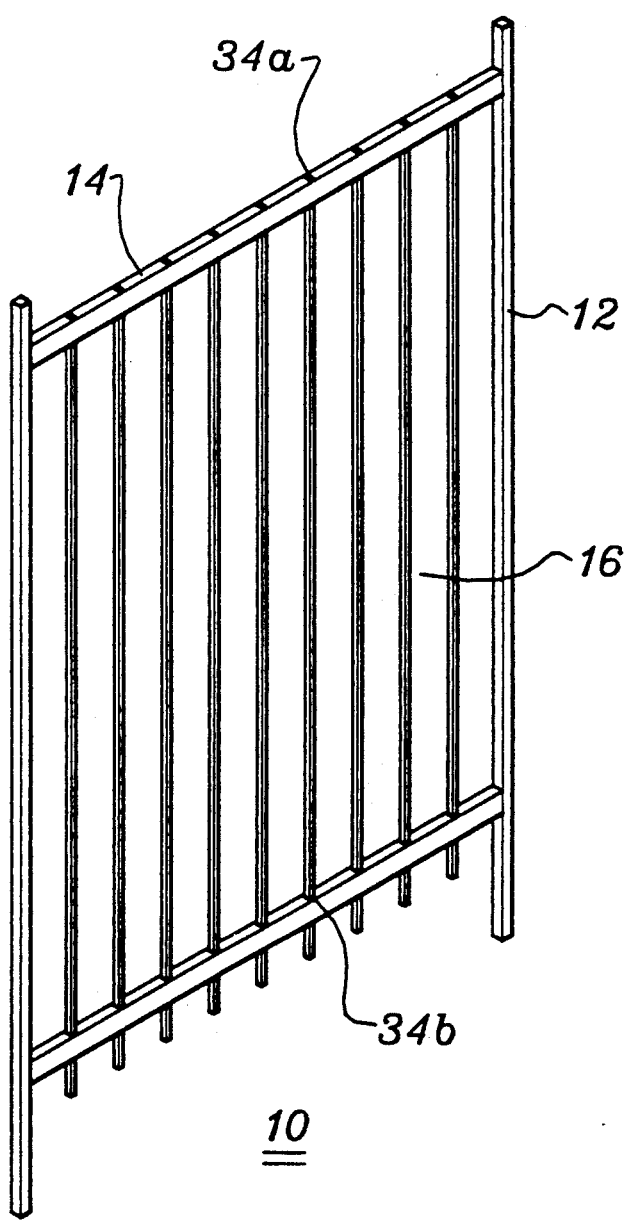
FIGS. 1 and 2 are perspective views of two types of metal picket fences which may be assembled through the use of the present constructional method.

With particular reference to FIG. 1, there is shown a picket fence 10, typically formed of metal, which includes two vertical elements 12, two horizontal elements 14, and a plurality of vertical pickets 16.

Figure 2:
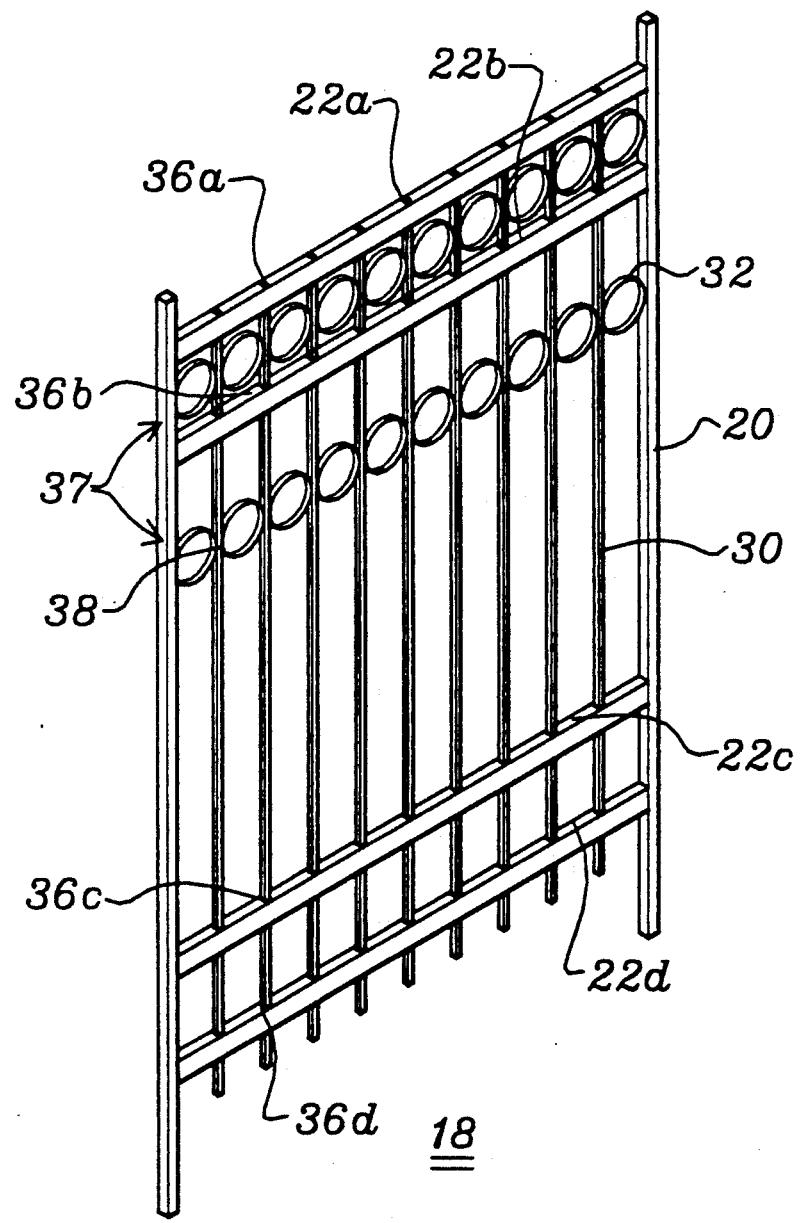

In the view of FIG. 2 is shown a second type of metal picket fence 18 which may be also be formed with the present inventive method. In this structure, the picket fence 18 includes left and right vertical elements 20, horizontal elements 22a thru 22d, a plurality of vertical pickets 30, and a plurality of hoops 32 which may be positioned between pickets 30 in any of a number of configurations, one of which is shown in FIG. 2.

Figure 11:
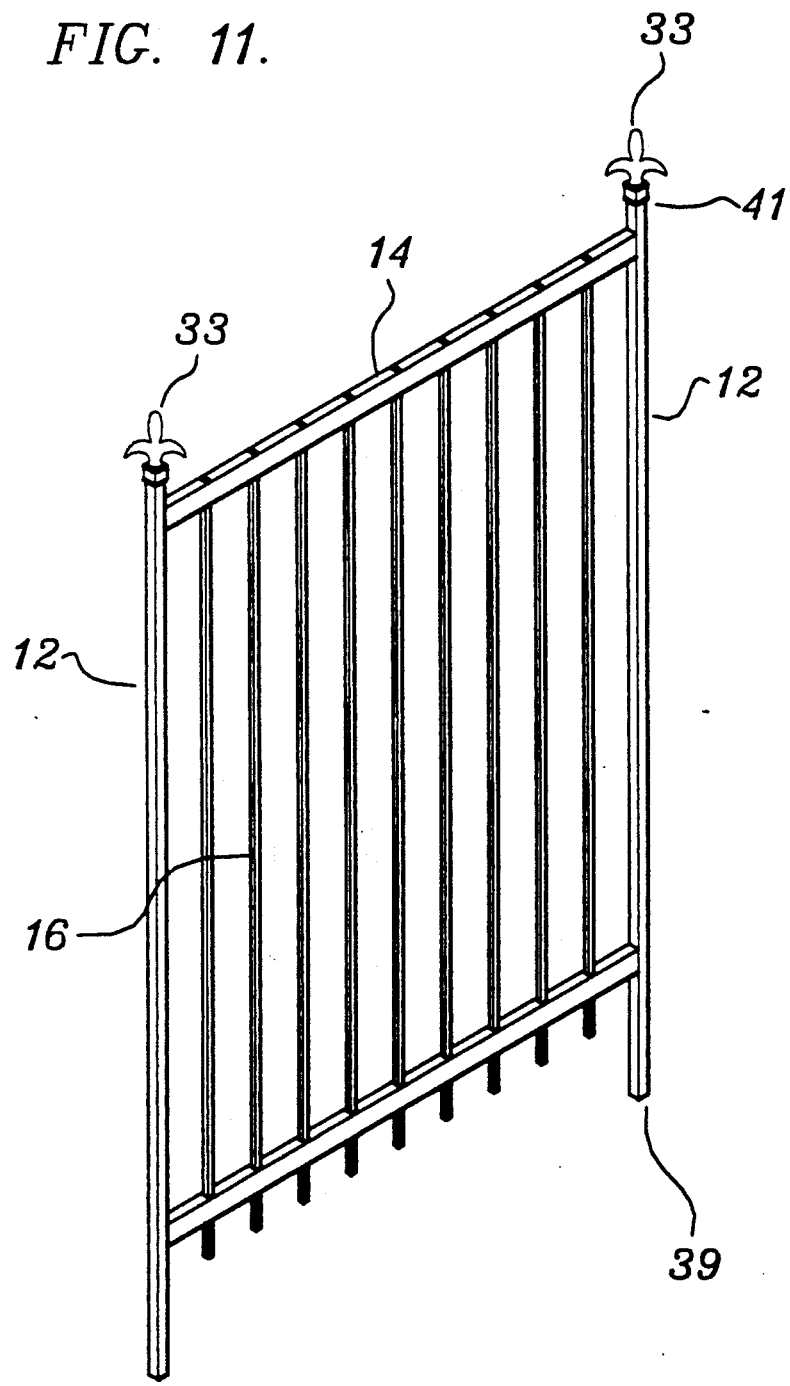
FIG. 11 is a perspective view of a further type of fence that may be constructed in accordance with the inventive method.
Figure 12:
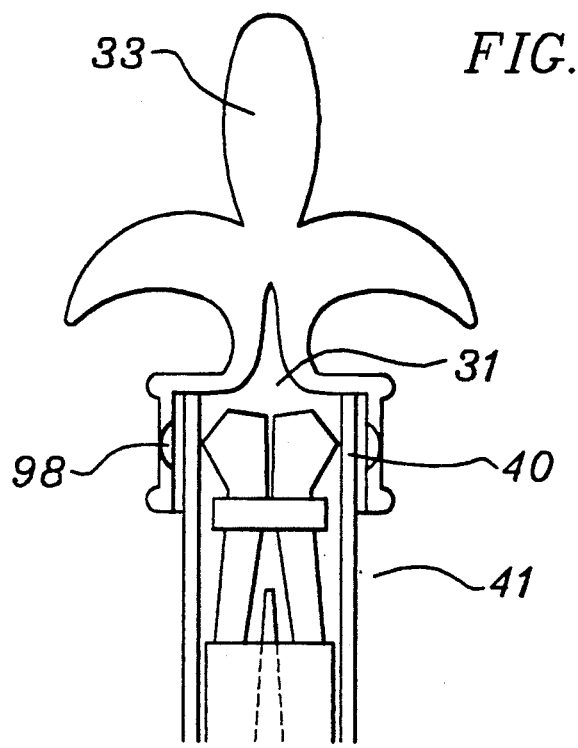
FIGS. 12 and 13 are enlarged cross-section schematic sequential views showing the present method with reference to a fence of the type shown in FIG. 11.

Shown in FIGS. 11 and 12 is a picket fence of the type of FIG. 1, however, also including thereupon emblems 33 having, as a part thereof, an internal tubular constructional region 31.

In the assembly of fences of the types of FIGS. 1, 2 and 11, several types of connections, known in the fence and metal working industry as swedges, are involved. The first of these is a connection between the pickets and the horizontal elements. Connections of this type occur at points 34a and 34b in the structure of FIG. 1, and at points 36a thru 36d, in the structure of FIG. 2.

Swedging of points 34b, and 36b thru 36d is not possible with prior art methods.

In a fence of the type of FIG. 2, a further type of connection 38 is necessary to secure hoops 32 to the vertical pickets 30. That is, one connection or swedge is required at each picket between hoops 32. A further type of connection 37 is necessary at the interface between a hoop 32 and vertical member 20.

To achieve the structure of FIG. 11, it is necessary to secure the uppermost end 41 of vertical elements 12 internally within region 31 of emblem 33. A connection of this type was not, in the prior art, possible in that such connection would have required accessing of the interior interface between vertical element 12 and the hollow region 31 of emblem 33 through the lowermost point 39 of the said vertical elements 12. Accordingly, prior art efforts to secure emblem 33 and like structures elements to vertical 12 typically included the use of quick or rapid setting thermoplastics, liquid solders, the like. Use of such quick setting polymers and resins are, it has been proven, susceptible to aging such, that over time, they will crumble and therefore lose their desired function of securing the emblem to the top 41 of the vertical elements 12.

As may be appreciated, in the structures shown in FIGS. 1, 2 and 11, the point of connection 34, 36, 37, 38 and 41 (also referred to herein as the working sites) may, depending upon the position of the worker or installer relative to the points of connection, be located a considerable distance therefrom, or may be inaccessible even if the worker is close to the working site.

It is also equally clear that if the use of welds or solder-like glue are to be avoided, the working sites internal to the constructional elements must be deformed to create rigid a connection between the vertical and horizontal or, in a given case, as in FIG. 11, the mutually vertical elements of the system. This can only be accomplished through the insertion within the inner cross-section of the tubular constructional element, a means having an inner diameter sufficiently small to reach the work sites and, further, having a means for transmitting mechanical energy from a power source to the end of the inserted means and, thereat, a means for applying a transverse force to enable deformation of a surface of the tubular constructional element.

Figure 3:
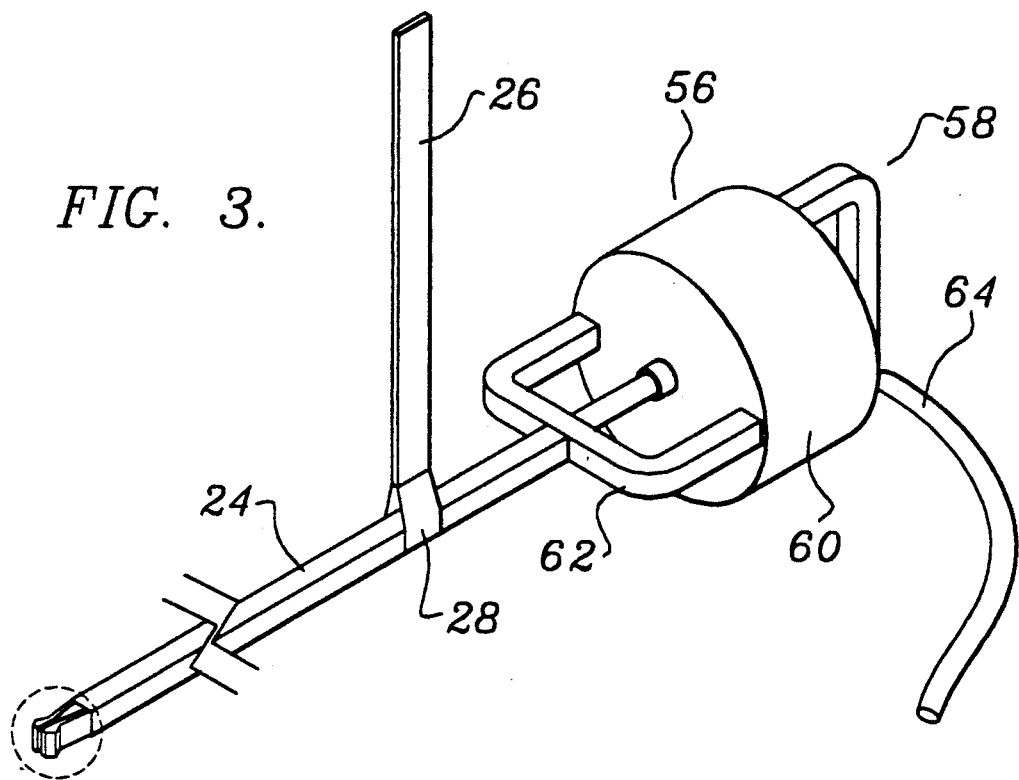
FIG. 3 is a perspective view of a tool which may be employed to practice the inventive method.
Figure 4:
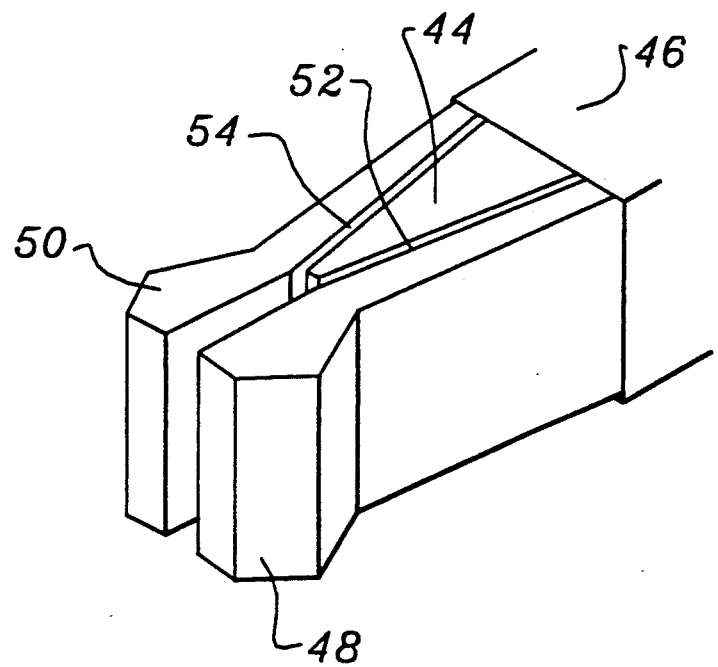
FIG. 4 is an enlarged view of the distal end portion tool shown in FIG. 3.

With reference to the perspective view of FIG. 3, including FIG. 4 which is an enlargement of the left side thereof, the constructional tool which is employed to facilitate the present inventive method and, more particularly, the step of applying through each tubular constructional element a transverse force to the desired point of deformation of the working surface, may be seen.

More particularly, the structure of FIGS. 3 and 4 may be seen to include an elongate central member 24 having a dimension sufficiently small such that it can fit within a first tubular constructional element which, in the structure of FIGS. 1, 2 and 11, corresponds to vertical picket elements 16 and 30. As may be noted in FIG. 3, because of the length of elongate central element 24, it is necessary to employ a support 26 such that the tool may be pivoted at its center of gravity about a fulcrum 28 by a worker.

With reference to FIG. 4, it may be noted that said central member 24 more particularly includes an extended longitudinal member 44 having at its distal end a left inclined surface 52 and a right inclined surface 54. Central member 24 includes a housing 46 and left and right working elements 48 and 50 respectively. The above may also be seen with reference to the left hand portion of the view of FIG. 5.

As is more fully set forth below, one of said working elements 48 or 50 may be provided with a configuration different from the other where, for example, a different or lesser degree of deformation is required at one side of the central member 24 or the other.

Also shown is FIG. 3 is a control assembly 56 of the longitudinal force transfer means of the present invention. The assembly 56 includes a handle 58, a pneumatic cylinder 60, and means for 62 for stabilizing central member 24 relative to cylinder 60. Also shown in FIG. 3 is a pneumatic input 64.

Figure 5:
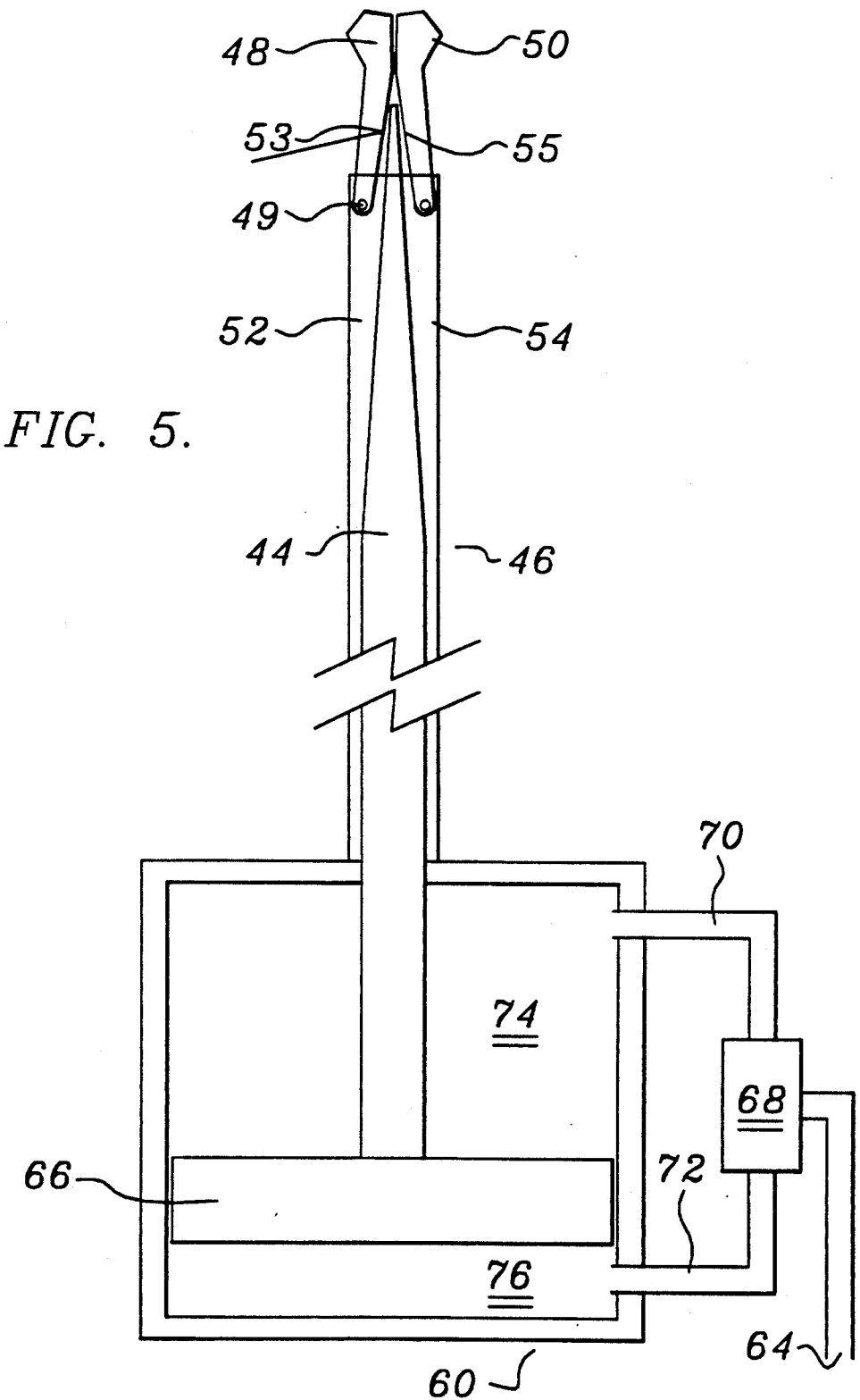
FIG. 5 is a schematic view of a pneumatic control circuit for the tool shown in FIGS. 3 and 4.

The structure of FIGS. 3 and 4 is shown in cross-sectional schematic view in FIG. 5. Therein is, more particularly, shown extended longitudinal member 44 and its associated integral piston means 66 within said pneumatic cylinder 60. As may be noted in FIG. 5, diagrammatic block 68 represents pneumatic control means of the system such that piston 66 and with it extended member 44 can be advanced to the left or right respectively dependent upon the fluid path 70 or 72 which compressed gas from input 64 is permitted to travel. That is, if channel 70 is opened, compressed gas will enter region 74 of the pneumatic cylinder 60, thereby moving piston 66 to the right and with it central member 44. This position corresponds to that shown in the view of FIG. 6. Therein working element 48'.(a variation of the working element 48 shown in FIGS. 4 and 5) and working element 50 have not yet been transversely moved by extended member 44. That is, surface 40 of picket 16 has not yet been deformed relative to internal structure 78 of horizontal fence member 14 or 22.

Figure 6:
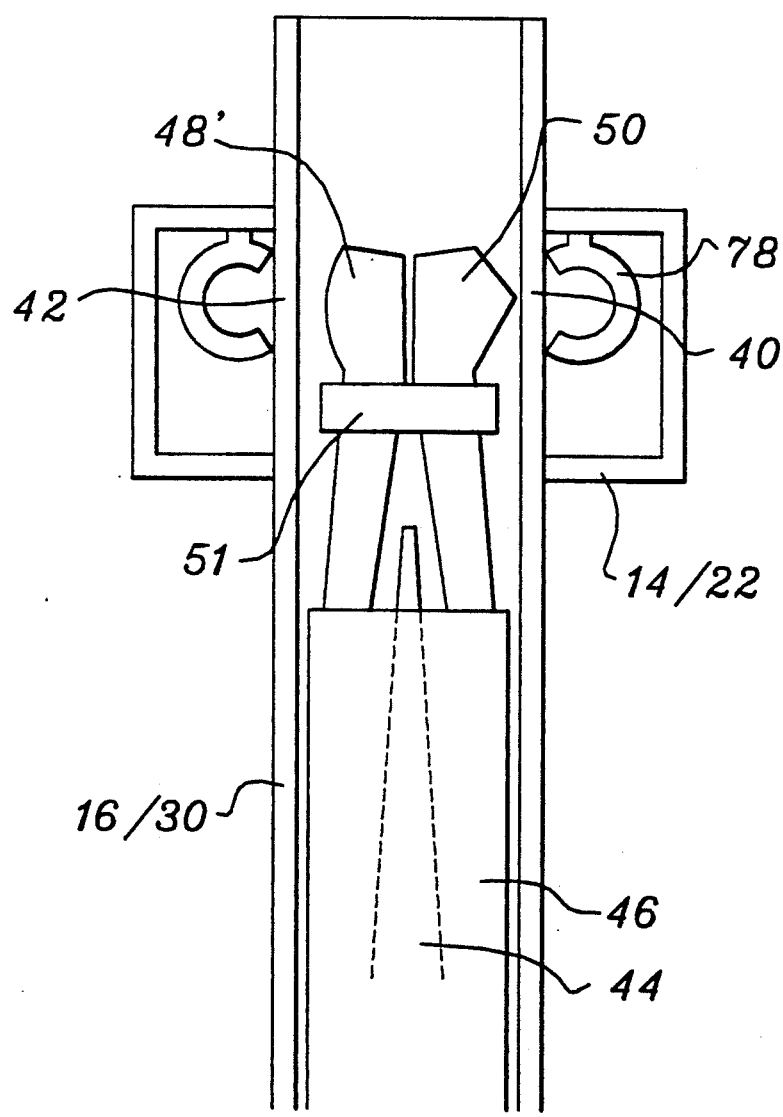
FIGS. 6 and 7 are cross-sectional schematic sequential views showing one use of the instant invention.
Figure 7:
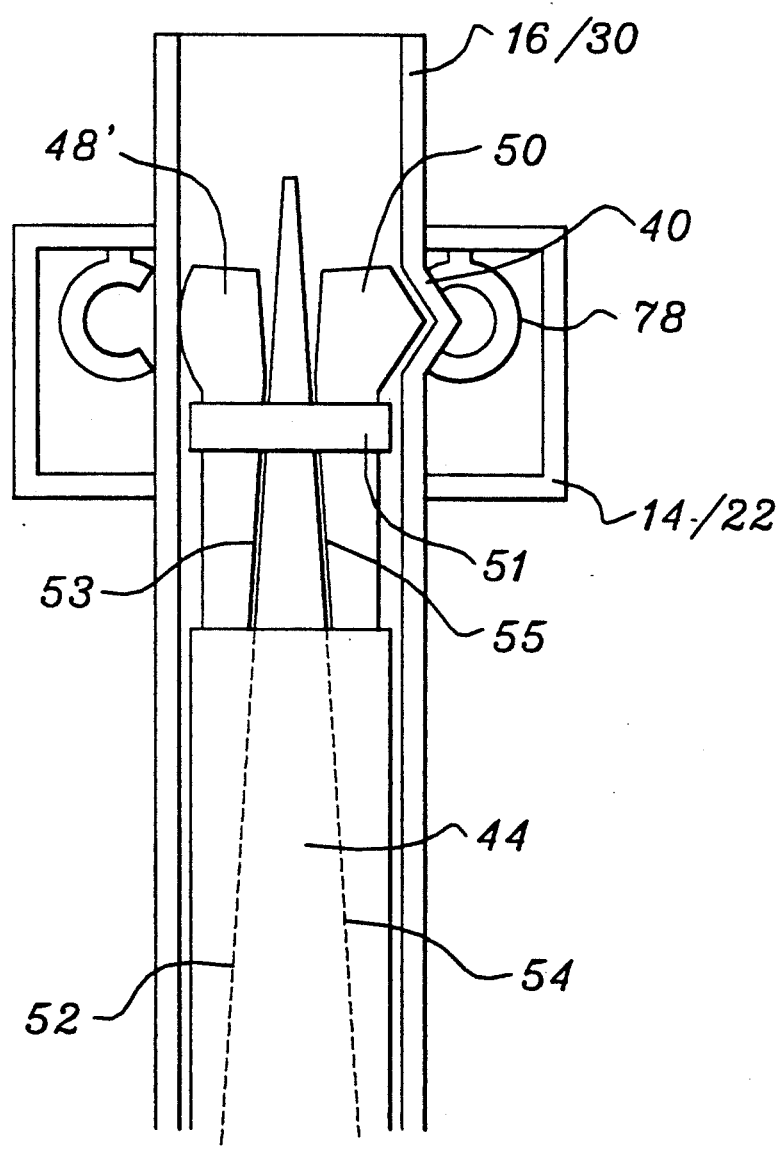

In the view of FIGS. 6 and 7 is shown elastic means 51 which acts to bias elements 48' and 50 relative to each other.

Figure 8:
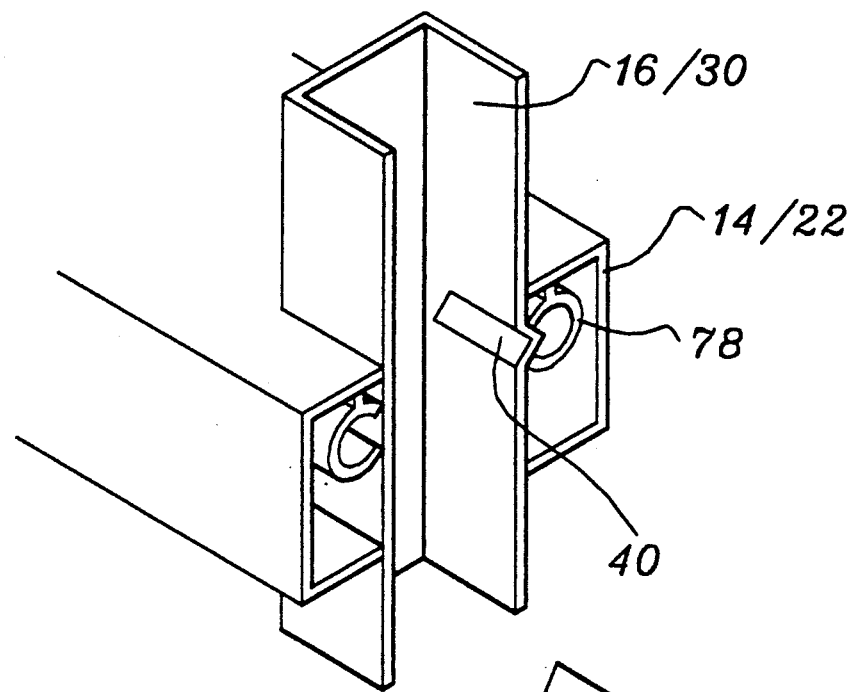
FIGS. 8 and 9 are cross-sectional schematic views showing the internal relationship between constructional elements which have been secured in accordance with the present method.

When compressed gas is permitted by control means 66 to flow through channel 72, such compressed gas will enter region 76 of cylinder 60 thereby causing piston 66 to move to the left. This causes incline surfaces 52 and 54 to slidably advance relative to the inner surfaces 53 and 55 of left and right working element 48' and 50 respectively, thereby causing the outer surface of working element 50 to deform surface 40 of picket 16 or 30 in the fashion shown in FIG. 7. Resulting therefrom, deformed portion 40 will be bent into the internal structure 78 of horizontal members 14 or 22, thereby accomplishing the riveting or securement of the vertical picket 16 or 30 to the horizontal member 14 or 22 of the fence system. The resulting mutually secured structure achieved after the removal of the tool from the structure of FIGS. 6 and 7 is shown in FIG. 8.

Figure 9:
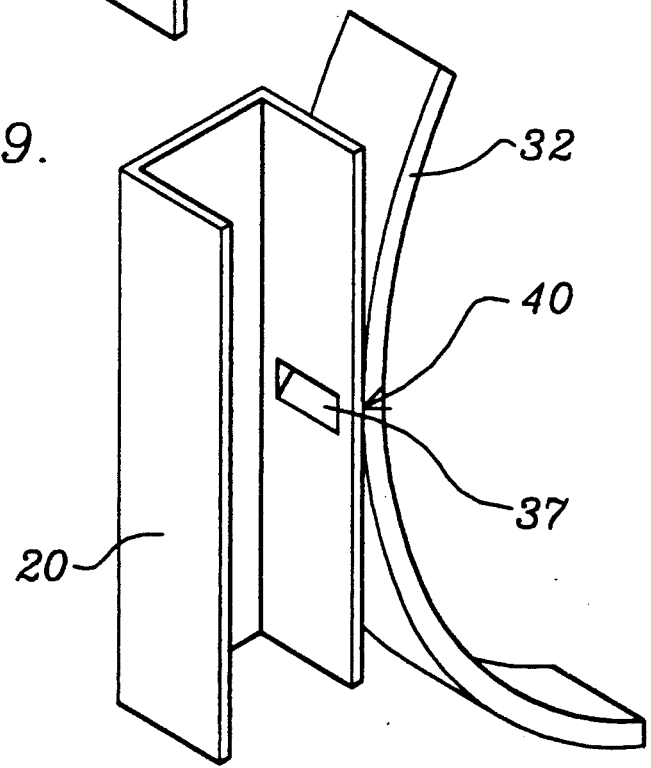

Shown in FIG. 9 is the result of the securement of vertical member 20 to hoop 32 at either of the points denoted by arrow 37 in FIG. 2.

It is to be noted that in the views of FIGS. 6 and 7, the working element 48 of FIGS. 4 and 5 has been replaced by a working element 48' such that only surface 40 will become deformed. If one wishes to achieve a symmetric deformation about the working elements 48 and 50, the element 48 shown in FIGS. 4 and 5 would be utilized thereby achieving the simultaneous deformation of surfaces 40 and 42. See FIG. 6 and FIG. 13 below. Such simultaneous deformation is desirable for securing or swedging at points 34 (see FIG. 1) and points 36b thru 36d (see FIG. 2). Therein, it is desirable to deform vertical members 16 and 30 (also referred to below as first tubular constructional elements) in a symmetrical fashion relative to a transverse tubular element to which they are connected. Such connections are described in further detail in the parent of this application, that is, With reference to the cross-sectional view of FIG. 10, there is shown the manner in which the tool may be selectively moved within a first tubular constructional element 80 and relative to a plurality of second tubular constructional elements 82 so that a plurality of deformable working surfaces 84 within first constructional element 80 may be selectively deformed by the working element 50 of extended longitudinal member 44 by simply moving from point-to-point within the first constructional element 82 until element 50 is positioned relative to a complemental internal structure 88 within second tubular constructional element 82. It is to be appreciated that in the structure of FIG. 10, and in the method related thereof, the same may readily be practiced in symmetry about the axis defined by longitudinal member 44 if working element 48' is replaced by the working element 48 shown in FIGS. 4 and 5.

Figure 13:
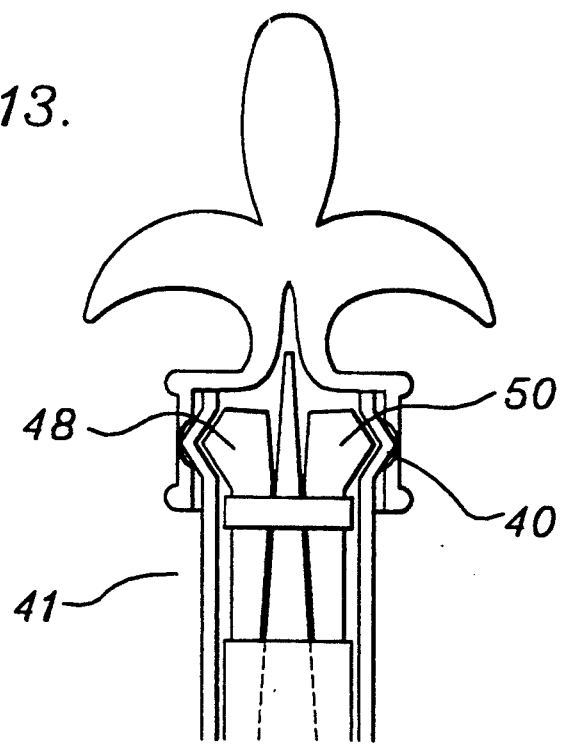

In the views of FIGS. 11 thru 13, there is shown a further application of the present inventive method. Therein, emblem 33 is to be secured upon hollow open end 41 of vertical elements 12. This is accomplished in the manner shown in FIGS. 12 and 13. More particularly, the emblem 33 is provided with a hollow internal structure 31 which includes a recess 98, such that when working elements 48 and 50 are pushed outward, deformable surfaces 40 will be pressed thereinto. As noted above, in the absence of a method of the present type, it would, as a practical matter, be impossible to achieve a rigid, long term reliable securement between the hollow vertical elements 12 and emblem 33.

Figure 14:
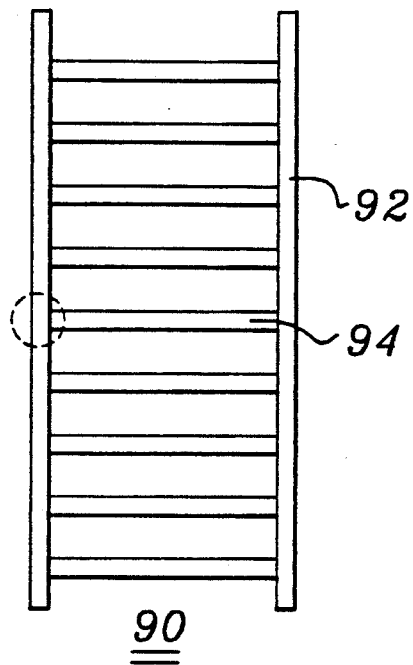
FIG. 14 is a plan view of a ladder constructed thru the use of the present method.
Figure 15:
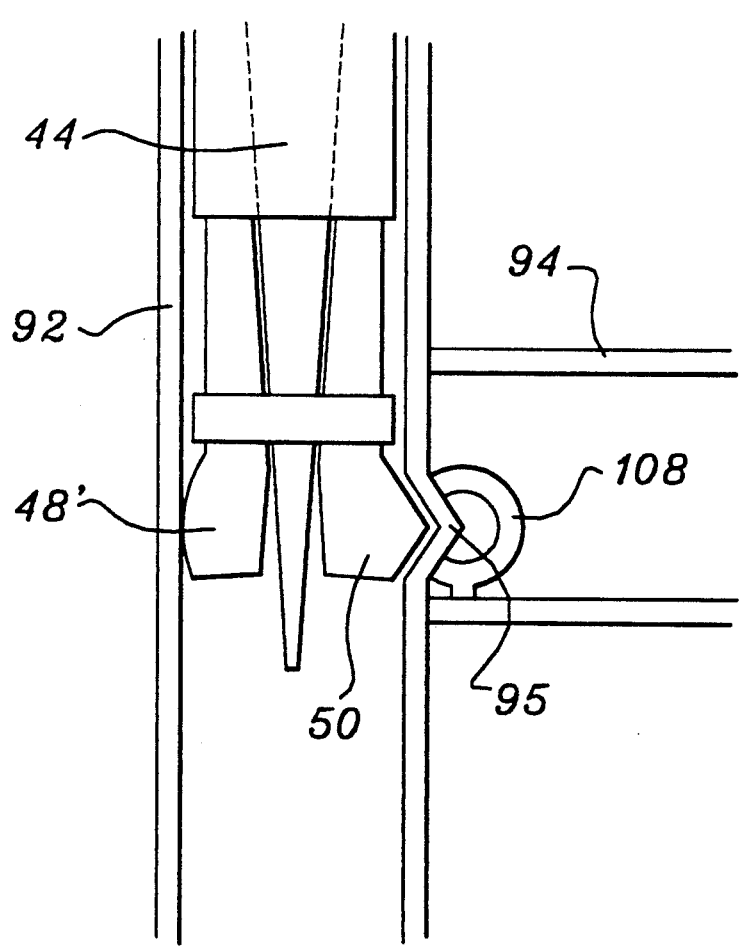
FIG. 15 is an enlarged view of the interior of the encircled portion of FIG. 14.

With reference to the views of FIG. 14 and 15, there is shown a ladder 90 consisting of a pair of hollow vertical members 92 and a plurality of hollow horizontal transverse elements 94.

Figure 10:
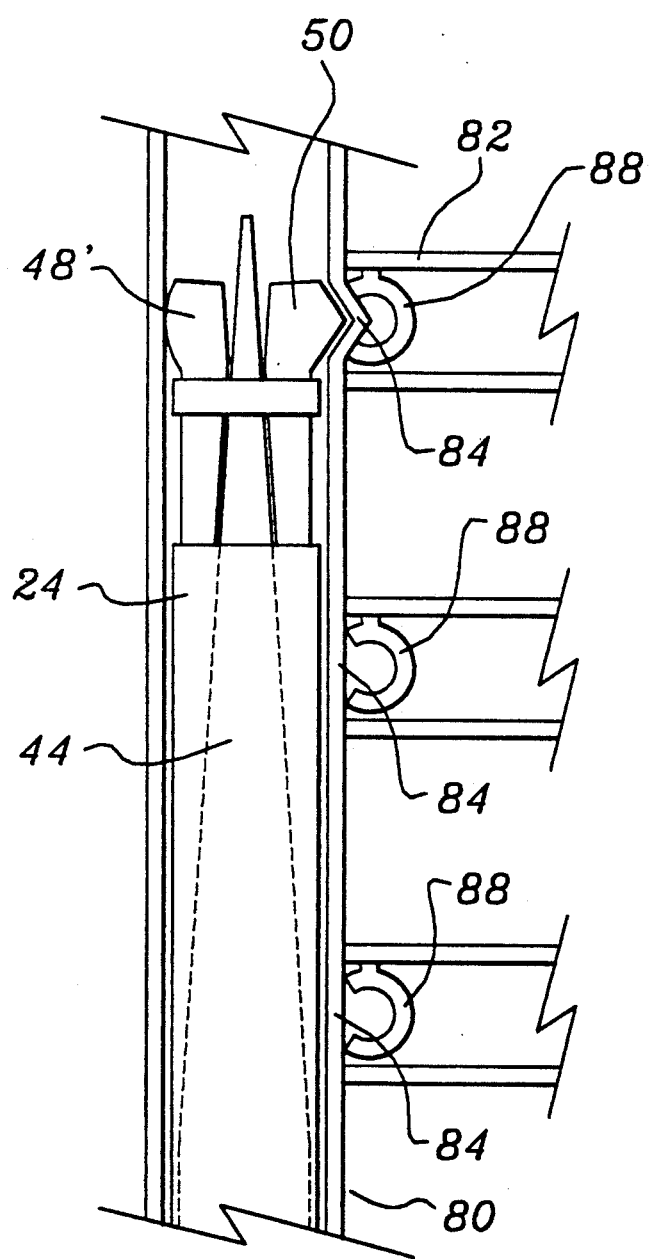
FIG. 10 is across-sectional operational view of the present invention in operation.

The securement of the horizontal elements, (the steps) 94 to the vertical members of the ladder is accomplished in much the fashion shown in the view of FIG. 10. Enlargement of one working site thereof and of FIG. 14 is shown in FIG. 15. Therein, it may be noted that as the tool advances either upwardly or downwardly within a tubular vertical member 92, working surface 50 will be actuated at appropriate linear points such that deformable surface 95 of vertical member 92 will be press-fittably secured within complemental internal structure 108 provided within each horizontal element 94.

It is to be appreciated that there exists any number of mechanical systems to which the present inventive method can be applied, so long as the constructional elements thereof are hollow tubular elements. Such tubular element may be either circular or rectangular in cross-section, so long as there is provided a suitable complemental internal structure for the receipt of a deformable working surface within the first tubular constructional element of the system.

Accordingly, while there has been shown and described the preferred embodiment of the present invention, it is to be appreciated that the invention may be embodied otherwise than is herein specifically shown and described and that, within such embodiment, certain changes may be made within the form and arrangement in the parts without departing from the underlying idea or principles of this invention within the scope of the Claims appended herewith.

Having thus described my invention, what I claim as new, useful and non-obvious and, accordingly, secure by Letters Patent of the United States is:

1. A method of assembly of components of a tubular metallic picket fence, comprising the steps of:

(a) furnishing, at an interior work site of a horizontal metallic tubular constructional element of the picket fence to be assembled, at least one internal structure having a defined female geometry spaced from the interior walls of said tubular constructional element;

(b) providing, through said horizontal constructional element, a vertical opening proximal to said defined internal structure, to enable passage therethrough of a vertical tubular constructional element;

(c) positioning said vertical tubular constructional element within said vertical opening of said horizontal element so that at least one surface of said vertical element is proximal to said defined internal structure of said horizontal element;

(d) providing, within said vertical tubular element, at said one surface of said vertical constructional element, a distal portion of a highly extended longitudinal member of substantially uniform cross-section having a smaller external diameter than the internal diameter of said vertical tubular element, said distal portion comprising at least one working surface transversely extensible in reaction to longitudinal extension of said extended member; and (e) providing and applying, through said extended longitudinal member, selectable powered longitudinal thrust of said extended member, sufficient to provide to said working surface of said distal portion of said extended member, a transverse force sufficient to deform said one surface of said vertical tubular constructional element into said defined female geometry of said internal structure of said horizontal tubular element, thereby effecting the securement of said vertical and horizontal constructional elements to each other.

2. The method of assembly of components of metallic fence as recited in claim 1, further comprising the step of:

(f) providing further defined female internal structures within said horizontal tubular element and corresponding further vertical openings through said horizontal element to thereby provide sites of securement to additional deformable surfaces of other vertical tubular elements.

3. The method as recited in claim 2, further comprising the steps of:

(g) providing a plurality of said horizontal constructional elements having a plurality of said vertical openings and corresponding defined internal structures, according to Step (f) above;

(h) providing a plurality of vertical tubular constructional elements for positioning within said openings;

(i) selectably positioning said working surface of said highly extended longitudinal member at each of said one surfaces of said vertical constructional elements requiring securement to said horizontal constructional elements at the sites of said defined internal structures; and (j) repeating Step (e) above, whereby all desired rigid securements, at internal intersections of horizontal and vertical tubular elements of the metallic fence, are thereby accomplished.

4. The method as recited in claim 3, further comprise the steps of:

securing ornamental elements to said tubular metallic fence by positioning such ornamental elements at vertical tubular elements to which securement of such ornamental elements is desired; and deforming surfaces of said vertical tubular elements to secure said ornamental elements as in Step (e) above.

* * * * *